(12) United States Patent
Parnell et al.

(10) Patent No.: US 11,461,694 B2
(45) Date of Patent: Oct. 4, 2022

(54) MACHINE LEARNING IMPLEMENTATION IN PROCESSING SYSTEMS

(71) Applicant: International Business Machines Corporation, Armonk, NY (US)

(72) Inventors: Thomas Parnell, Zurich (CH); Celestine Duenner, Wettswil (CH); Dimitrios Sarigiannis, Zurich (CH); Charalampos Pozidis, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 1043 days.

(21) Appl. No.: 16/144,550

(22) Filed: Sep. 27, 2018

(65) Prior Publication Data

US 2020/0104276 A1   Apr. 2, 2020

(51) Int. Cl.
*G06N 20/00* (2019.01)
*G06F 17/16* (2006.01)
*G06F 17/13* (2006.01)

(52) U.S. Cl.
CPC ............ *G06N 20/00* (2019.01); *G06F 17/13* (2013.01); *G06F 17/16* (2013.01)

(58) Field of Classification Search
None
See application file for complete search history.

(56) References Cited

U.S. PATENT DOCUMENTS

| 9,941,943 | B1 | 4/2018 | Wu et al. | |
|---|---|---|---|---|
| 10,157,347 | B1* | 12/2018 | Kasturi | G06F 16/3326 |
| 2015/0310329 | A1* | 10/2015 | Dognin | G06N 3/08 |
| | | | | 706/25 |
| 2015/0347414 | A1 | 12/2015 | Xiao et al. | |
| 2016/0247089 | A1 | 8/2016 | Zhao et al. | |
| 2017/0236072 | A1 | 8/2017 | Rendle et al. | |
| 2017/0359754 | A1 | 12/2017 | Yousefi'zadeh et al. | |
| 2018/0025268 | A1* | 1/2018 | Teig | G06N 3/063 |
| | | | | 706/25 |
| 2018/0330271 | A1* | 11/2018 | Maleki | G06K 9/627 |

OTHER PUBLICATIONS

Choosing Method of the Most Effective Nested Loop Shearing for Parallelism, Iwasawa et al., Eighth International Conference on Parallel and Distributed Computing, Applications and Technologies, 0-7695-3049-4/07 © 2007 IEEE.*

(Continued)

*Primary Examiner* — David J Stoltenberg
(74) *Attorney, Agent, or Firm* — Scully, Scott, Murphy & Presser, P.C.; Daniel P. Morris (57) ABSTRACT

Methods are provided for implementing training of a machine learning model in a processing system, together with systems for performing such methods. A method includes providing a core module for effecting a generic optimization process in the processing system, and in response to a selective input, defining a set of derivative modules, for effecting computation of first and second derivatives of selected functions ƒ and g in the processing system, to be used with the core module in the training operation. The method further comprises performing, in the processing system, the generic optimization process effected by the core module using derivative computations effected by the derivative modules.

20 Claims, 4 Drawing Sheets

(56) References Cited

OTHER PUBLICATIONS

Stochastic Gradient Descent on Highly-Parallel Architectures, Ma et al., arXiv:1802.08800v1 [cs.DB] Feb. 24, 2018.*

Hsieh, C.-J., et al., "A Dual Coordinate Descent Method for Large-scale Linear SVM", Proceedings of the 25th International Conference on Machine Learning, 2008, https://www.csie.ntu.edu.tw/~cjlin/papers/cddual.pdf, Accessed on Sep. 25, 2018, 14 pages.

Shalev-Shwartz, S., et al., "Stochastic Dual Coordinate Ascent Methods for Regularized Loss Minimization", Journal of Machine Learning Research, Submitted Sep. 12, 2018, Revised Jan. 2013, Feb. 2013, http://www.jmlr.org/papers/volume14/shalev-shwartz13a/shalev-shwartz13a.pdf, Accessed on Sep. 25, 2018, pp. 567-599, vol. 14.

Fan, R.-E., et al., "LIBLINEAR: A Library for Large Linear Classification", Journal of Machine Learning Research, Submitted May 2008, Published Jun. 2008, https://www.csie.ntu.edu.tw/~cjlin/papers/liblinear.pdf, Accessed on Sep. 25, 2018, pp. 1871-1874, vol. 9.

Tensorflow, "Module: tf.sdca", https://www.tensorflow.org/versions/r1.1/api_docs/python/tf/sdca, Last updated on Aug. 15, 2018, Accessed on Sep. 25, 2018, 1 page.

Hsieh, C.-J., et al., "PASSCoDe: Parallel Asynchronous Stochastic dual Co-ordinate Descent", Submitted on Apr. 6, 2015, https://arxiv.org/abs/1504.01365, Accessed on Sep. 25, 2018, 25 pages.

Parnell, T., et al., "Large-Scale Stochastic Learning using GPUs", 2017 IEEE International Parallel and Distributed Processing Symposium Workshops, May 29-Jun. 2, 2017, pp. 419-428.

Richtarik, P., et al., "Iteration Complexity of Randomized Block-Coordinate Descent Methods for Minimizing a Composite Function", Submitted on Jul. 14, 2011, https://arxiv.org/abs/1107.2848, Accessed on Sep. 25, 2018, 33 pages.

* cited by examiner

MACHINE LEARNING IMPLEMENTATION IN PROCESSING SYSTEMS

BACKGROUND

The present disclosure relates generally to implementation of machine learning in processing systems. In particular, methods are provided for implementing training of machine learning models in processing systems where the training employs a stochastic coordinate descent technique to optimize an objective function, together with apparatus and computer program products for performing such methods.

Machine learning is a cognitive computing technique that allows a processing system to "learn" procedures for tackling complex tasks which are not programmed in a conventional manner. Machine learning involves processing a (typically massive) dataset of training data from some real-word application in relation to a basic model for the application in order to train, or optimize, the model for the application in question. The model can then be applied to perform tasks based on new (unseen) data generated in that application. Machine learning techniques are used in numerous applications in science and technology. Some examples include computer vision, speech recognition, click-through rate prediction, medical diagnosis, genetic analysis, pharmaceutical drug design, and numerous applications in the field of computer networks such as intruder detection, email filtering, fault analysis and network maintenance.

A large class of machine learning problems require optimization of a function $F(w)$ of the general form $F(w)=f(Xw)+\Sigma_{j=1}^{m}g(w_j)$, where w is a length-m model vector, X is an n-by-m matrix of training data, $f$ and g are convex functions and $f$ is smooth. Many important techniques in machine learning can be expressed in this way, including logistic regression, linear regression and support vector machines. An optimization process known as "stochastic coordinate descent" has been shown to achieve state-of-the-art performance when applied to such problems (see: "A Dual Coordinate Descent Method for Large-scale Linear SVM", Hsieh et al. Proceedings of the 25th international conference on machine learning, ACM, 2008; and "Stochastic Dual Coordinate Ascent Methods for Regularized Loss Minimization", Shalev-Shwartz and Zhang, Journal of Machine Learning Research, 14 Feb. (2013), pp. 567-599). Stochastic coordinate descent treats the global optimization problem as a sequence of one-dimensional optimization sub-problems, whereby each sub-problem consists of optimizing the objective function with respect to a single coordinate (e.g. the $j^{th}$ element of w) while keeping all other coordinates fixed. This method has been shown to converge faster than existing techniques such as stochastic gradient descent, and has been incorporated in widely-used machine learning tools such as the LIBLINEAR and TensorFlow tools. While stochastic coordinate descent has many advantages, it can be difficult to implement in practice since the exact equations that define the solution to the individual sub-problems can take many different forms, depending on the precise functional form of $f$ and g in the objective function above. The LIBLINEAR system employs different code for each of the different optimization problems offered by the system. The TensorFlow system is only applicable to a limited subset of the above optimization problems relating to the dual-formulation of various machine learning tasks.

Machine learning is a compute-intensive task, involving inherently complex processing of typically very large datasets. Significant processing resources, usually provided by powerful processing systems using multi-core CPUs (central processing units), GPUs (graphics processing units) and/or FPGAs (field-programmable gate arrays) are required for practical operation. Efficient implementation of machine learning systems using stochastic coordinate descent is further complicated by the variety of different functional forms within a given class of learning problems.

SUMMARY

According to at least one embodiment of the present invention there is provided a method for implementing training of a machine learning model in a processing system, the training requiring optimization of an objective function $f(Xw)+\Sigma_{j=1}^{m}g(w_j)$ of a length-m model vector w and an n-by-m matrix X of training data where $f$ and g are convex functions and $f$ is smooth. The method includes providing a core module for effecting a generic optimization process in the processing system, and in response to a selective input, defining a set of derivative modules, for effecting computation of first and second derivatives of selected functions $f$ and g in the processing system, to be used with the core module in the training operation. The method further comprises performing, in the processing system, the generic optimization process effected by the core module using derivative computations effected by the derivative modules. The generic optimization process effected by the core module comprises an outer iterative loop which computes, for a dual vector $v=Xw$, a transformed vector y comprising a function of vectors of first and second derivatives of $f(v)$, performs a plurality of iterations of an inner loop of stochastic coordinate descent to update the model vector w and transformed vector y by respective update amounts dependent on first and second derivatives of $f(v)$ and $g(w_j)$, and updates the dual vector v in dependence on the updated transformed vector y.

By implementing the training operation in this way in a processing system, using a core module effecting the generic optimization process described, the system can train any arbitrary model using the objective function $F(w)$, regardless of the particular functional form of the functions $f$ and g. The core module provides a generic computational module for training all models of the type described, and model-training systems capable of accommodating a general class of machine learning problems can be implemented in an exceptionally efficient manner.

A plurality of derivative modules, for effecting computation of first and second derivatives of different functions $f$ and different functions g in the processing system, may be provided in some embodiments. The particular set of derivative modules for the selected functions $f$ and g to be used with the core module may then be defined by selecting those derivative modules from the plurality of derivative modules in response to the selective input. In other embodiments, for example, the processing system may generate the required set of derivative modules in response to a selective input indicating the selected functions $f$ and g. The required derivative modules can thus be generated on-demand for particular functions $f$, g specified for a training operation.

In general, the core module and the derivative modules may be implemented in hardware or software or a combination thereof. Embodiments of the invention thus offer highly efficient hardware- and/or software-based implementations.

Respective further embodiments of the invention provide processing systems for implementing a method described above, and computer program products for causing a processing system to implement such a method.

In general, where features are described herein with reference to methods embodying the invention, corresponding features may be provided in systems/computer program products embodying the invention, and vice versa.

Embodiments of the invention will be described in more detail below, by way of illustrative and non-limiting example, with reference to the accompanying drawings.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Methods embodying the invention implement training of machine learning models in processing systems. The training process requires optimization of an objective function $F(w)$ of the form $F(w)=f(Xw)+\Sigma_{j=1}^{m}g(w_j)$, where X is an n-by-m matrix of training data and w is a length-m model vector. The training data matrix X thus has n rows and m columns of data elements. The model vector w is an m-dimensional vector with elements $w_1, w_2, \ldots, w_m$. The function $f$ is a convex smooth function of the so-called "dual vector" v which is defined as $v=Xw$. The function g is a convex function over the coordinates of the model vector w.

Figure 1:
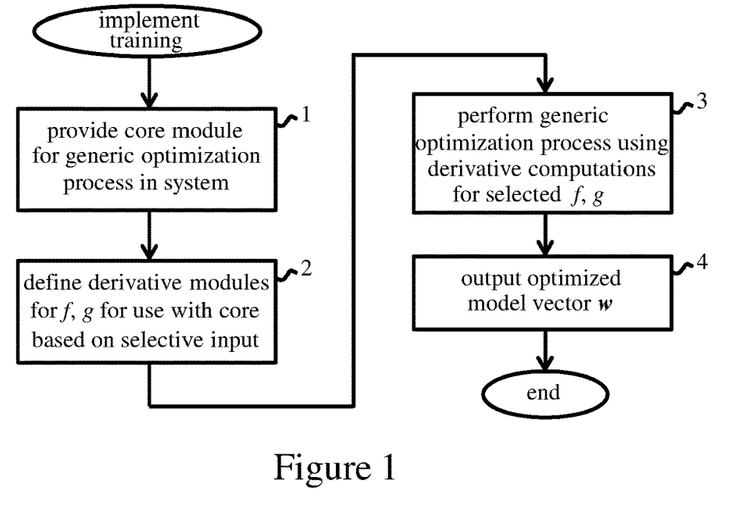
FIG. 1 indicates steps of a method embodying the invention for implementing training of a machine learning model in a processing system.

Basic steps of a method embodying the invention are indicated in the flow diagram of FIG. 1. As indicated at step 1, a core module is provided for effecting a generic optimization process in the processing system. In step 2, a set of derivative modules for use with the core module in the training operation are defined in the processing system. These derivative modules effect computation of first and second derivatives of selected functions $f$ and g in the processing system. The set of derivative modules to be used with the core module is defined in response to a selective input to the system. The selective input (e.g., from a user, host computer or high-level system controller) effectively selects the particular forms of the functions $f$ and g for the model to be trained. Derivative modules for arbitrary functions $f$ and g can thus be selected in this step, these derivative modules then being defined in the system as the modules to be used in the current training operation. The selective input may indicate a derivative module selection in various ways. For example, in some embodiments the selective input may indicate a user/host selection from among a plurality of derivative modules, provided in the processing system, for effecting computation of derivatives of different functions $f$ and different functions g. In other embodiments, for example, the required set of derivative modules may be provided as the selective input to the system, e.g. as static functions accessible via virtual function calls. In further embodiments, the selected functions $f$, g may be provided by a host/user as the selective input and the system is adapted to generate the required derivative modules, e.g. as program modules or configurable hardware modules, for computing the derivatives of the selected functions $f$, g.

Once the required derivative modules have been defined, the training operation is performed in step 3. Here, the processing system performs the generic optimization process effected by the core module using derivative computations effected by the derivative modules defined for that training operation. After training, the optimized model vector w is output by the system in step 4 and operation is complete.

Figure 2:
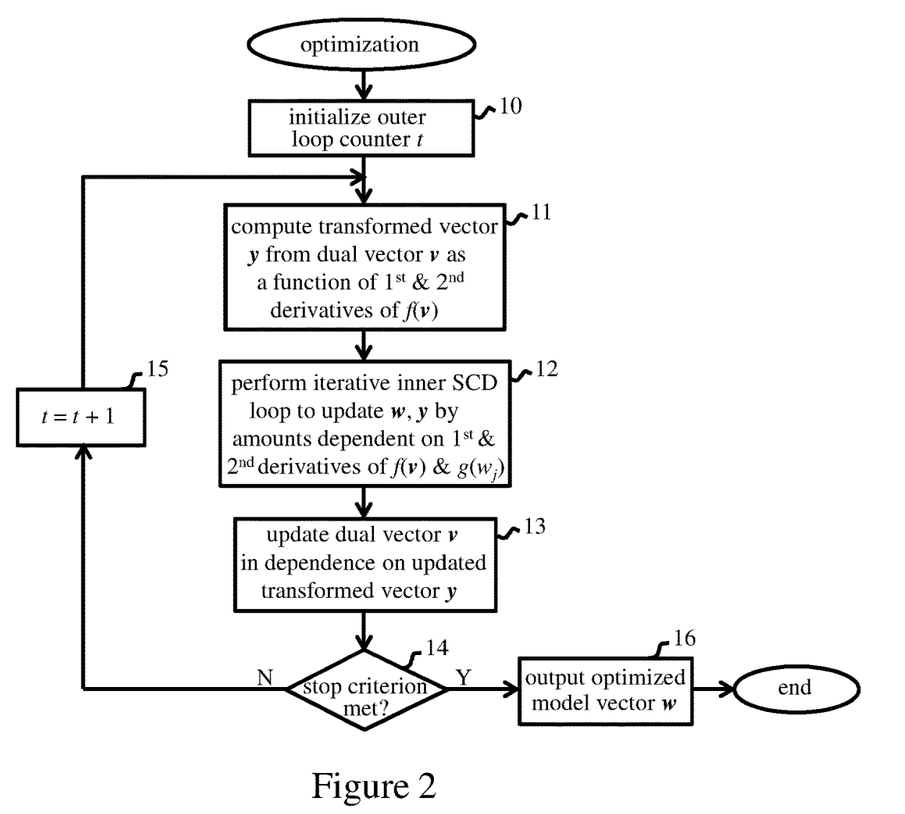
FIG. 2 indicates steps of a generic optimization process used in the FIG. 1 method.

FIG. 2 indicates steps of the generic optimization process effected by the core module in the FIG. 1 method. This process comprises outer and inner iterative loops. In step 10 of FIG. 2, the system initiates an outer loop counter t to t=0. In step 11, the system computes a transformed vector y from the dual vector $v=Xw$. The transformed dual vector y comprises a function of vectors of first and second derivatives of $f(v)$. This step uses derivative computations effected by the derivative modules for the selected form of the function $f$. Next, in step 12, the system performs a plurality of iterations of the inner loop. This loop executes successive iterations of a process of stochastic coordinate descent (SCD) for respective coordinates j of the model vector w. Each iteration of the inner loop updates the model vector w and transformed vector y by respective update amounts which are dependent on first and second derivatives of $f(v)$ and $g(w_j)$. This process thus uses derivative computations effected by the derivative modules for the selected forms of $f$ and g. In the next step of the outer loop, step 13, the system updates the dual vector v in dependence on the updated transformed vector y. In step 14, the system then determines whether a predetermined "stop criterion" has been met. This stop criterion can be defined as desired for a given operation. For example, the stop criterion may be defined as completion of a specified number of iterations of the outer loop, or as obtaining a change in a specified value (e.g. the function F evaluated for w, or the maximum change in a component of the model vector or dual vector) between successive iterations of the outer loop that is less than a defined threshold, or a combination of such conditions. If the stop criterion is not met ("No" (N) at decision step 14), then the outer loop counter is incremented in step 15 and operation reverts to step 11 for the next iteration of the outer loop. When the stop criterion is met ("Yes" (Y) at decision step 14), the optimized model vector is output at step 16 and the training operation is complete.

The above method provides a highly efficient implementation for training machine learning models in a processing system, permitting exceptionally efficient use of resources. The core module provides a single, generic computational core which can be used to train an arbitrary number of machine learning models (e.g. logistic regression, support vector machines, linear regression, ridge regression, and many more) in both their primal and dual forms. The generic process effected by the core module repeatedly makes quadratic approximations to the functions $f$ and g, and repeatedly converts the dual vector v to the new vector y in a transformed space. The inner SCD loop is then performed in that space. This allows a single update rule to be applied for all functional forms of $f$ and g. The derivative modules to be used with the core module can be selected as desired, and a model-training system for a general class of machine learning problems can be implemented in an exceptionally efficient manner.

Figure 3:
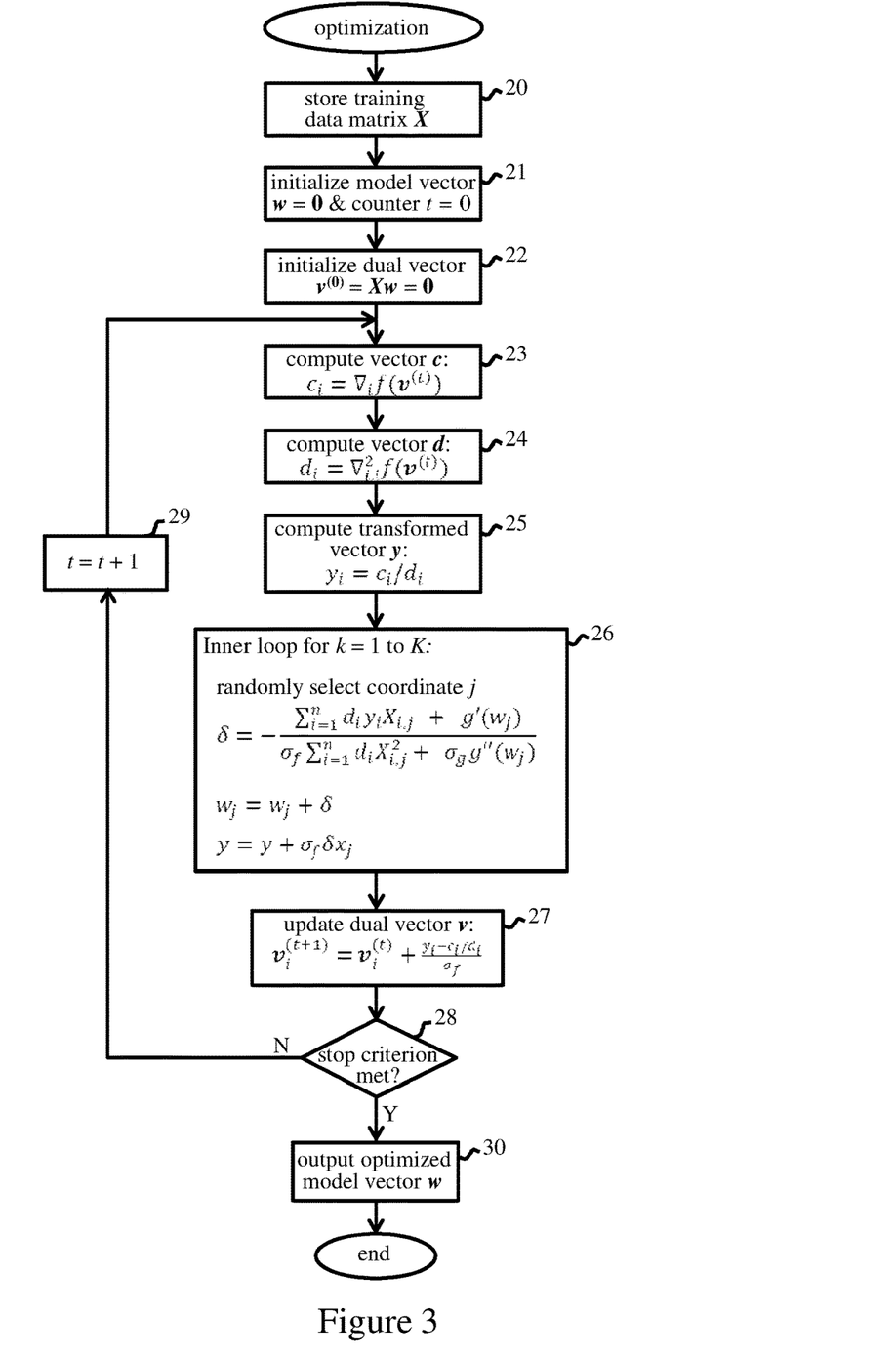
FIG. 3 indicates more detailed steps of the generic optimization process in an embodiment of the invention.

An embodiment of the generic optimization process is illustrated in more detail in FIG. 3 for optimizations of the form:

$$\underset{w}{\operatorname{argmin}}\left[f(Xw)+\sum_{j=1}^{m}g(w_j)\right],$$

$w \in \mathbb{R}^m$, $X \in \mathbb{R}^{n \times m}$. In step 20 of this figure, the matrix X of training data samples is stored in the processing system. In step 21, the system initializes the outer loop counter to t=0 and sets the model vector w to an initialization value, here to w=0. In step 22, the system initializes the dual vector $v = Xw \in \mathbb{R}^n$. The dual vector v is thus a length-n (n-dimensional) vector with elements $v_i$, i=1 to n. In this example, the dual vector $v^{(t)}$ for the initial (t=0) iteration of the outer loop is $v^{(0)}=0$. The system then computes the transformed dual vector y. In step 23, the system first computes a vector c which comprises the gradient vector of $f(v)$ at the current value of the dual vector v. The vector c is computed here as $c_i = \nabla_i f(v^{(t)})$, where $c_i$ denotes the $i^{th}$ element of c and $\nabla_i f(v^{(t)})$ denotes the first derivative of $f(v^{(t)})$ with respect to coordinate i. Next, in step 24, the system computes a vector d which comprises the diagonal of the Hessian matrix of $f(v)$ at the current value of the dual vector v. The vector d is computed here as $d_i = \nabla_{i,i}^2 f(v^{(t)})$ where $d_i$ denotes the $i^{th}$ element of d and $\nabla_{i,i}^2 f(v^{(t)})$ denotes the second derivative of $f(v^{(t)})$ with respect to coordinate i in each case (i.e. the vector d is the diagonal of the Hessian matrix of $f(v^{(t)})$. In step 25, the system then computes the transformed vector y as the (element-wise) ratio of vectors c and d, i.e. $y_i = c_i/d_i$. This value of the transformed vector y is then stored, e.g. in cache memory, of the system for use in subsequent steps of the optimization process.

The iterative inner loop is performed in step 26. This step performs a number K of SCD iterations on an approximation to the global objective function F(w) obtained by making the quadratic approximation to the function $f(v)$, via the transformed vector y, in outer loop steps 23 to 25 and a making a quadratic approximation to $g(w_1)$ in each iteration of the inner loop. The number K of inner iterations can be selected as desired, typically as K=m. Specifically, for each iteration k=1 to K of the inner loop, the system randomly selects a (previously unselected) coordinate j in the range 1 to m. The system then computes an update value δ as follows. A variable V1 is computed by summing the element-wise product of the vectors d, y and the $j^{th}$ column of matrix X. A variable V2 is computed by summing the element-wise product of the vector d with the element-wise squares of the $j^{th}$ column of X. The update value δ for the $j^{th}$ coordinate is then computed as $$\delta = -\frac{V1 + g'(w_j)}{\sigma_f V2 + \sigma_g g''(w_j)},$$

where: $g'(w_j)$ is the first derivative of g evaluated at the $j^{th}$ element of model vector w; $g''(w_j)$ is the second derivative of g evaluated at the $j^{th}$ element of w; and $\sigma_f$ and $\sigma_g$ are approximation constants. The update value is thus given in full by:

$$\delta = -\frac{\sum_{i=1}^{n} d_i y_i X_{i,j} + g'(w_j)}{\sigma_f \sum_{i=1}^{n} d_i X_{i,j}^2 + \sigma_g g''(w_j)}$$

The constants $\sigma_f$ and $\sigma_g$ are parameters that control the approximation error when making the quadratic approximations to the functions $f$ and $g$ respectively, and can be selected as desired. These constants may be set as $\sigma_f = \sigma_g = 1$ in an exemplary implementation.

After computing the update value for a coordinate j in an iteration of the inner loop, the system updates the $j^{th}$ coordinate $w_j$ of the model vector w to $w_j + \delta$. The transformed vector y is also updated to $y + \sigma_f \delta x_j$, where $x_j$ is the $j^{th}$ column of the matrix X.

On completion of all K inner iterations for respective coordinates j, the dual vector v is updated in the next step, step 27, of the outer loop. The system updates the dual vector by an update amount dependent on the (element-wise) difference between the updated transformed vector y at the end of the K inner loop iterations and the transformed vector, stored in step 25, at the start of the inner loop. Specifically here, the system subtracts the $i^{th}$ element $c_i/d_i$ of the previously stored vector from the $i^{th}$ element $y_i$ of the updated transformed vector, and updates the $i^{th}$ element $v_i$ of dual vector v $$v_i + \frac{y_i - c_i/d_i}{\sigma_f}.$$

The system then repeats the outer loop for successive iterations t=t+1 (step 29) until the stop criterion is met in decision step 28. The optimized model vector w is then output in step 30 and the process terminates.

The above process can be used to solve arbitrary optimization problems of the general form described. A single SCD update rule is applied for any of these optimization problems, this update rule being expressed in terms of the derivatives of the functions $f$ and $g$, the transformed vector y, and the model vector w and matrix X. Moreover, while the above example focuses on a minimization problem corresponding to a primal form of the optimization process, the process can be adapted in a straightforward manner to the dual formulation (involving a maximization problem) as will be readily apparent to those skilled in the art.

Model training systems embodying the invention can be efficiently implemented with a single computational unit that is capable of training an arbitrary number of machine learning models. Functionality of modules can be implemented, in general, in hardware and/or software, offering highly efficient hardware- and/or software-based implementations of widely-applicable model training systems. Exemplary implementations are described in the following.

Figure 4:
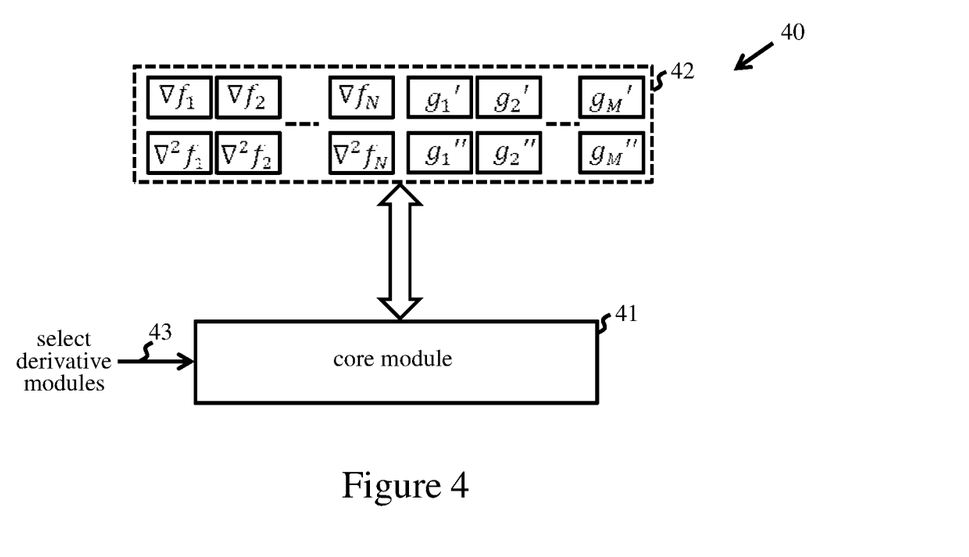
FIG. 4 is a schematic representing of a hardware implementation of a processing system embodying the invention.

FIG. 4 indicates structure of a hardware-based processing system for implementing the above method. The system 40 comprises a core module 41 operatively connected to a plurality of derivative modules 42. All system modules are implemented by ASIC (application-specific integrated circuit) hardware units. Derivative modules 42 include N pairs of derivative modules, labeled $\nabla f_p$ and $\nabla^2 f_p$ (p=1 to N), adapted to compute first and second derivatives of different functions $f_p$ of a dual vector v. Modules 42 also include M pairs of derivative modules, labeled $g_q'$ and $g_q''$ (q=1 to M), adapted to compute first and second derivatives of different functions $g_q$ of a model vector element $w_j$. Core module 41 is adapted to implement the generic optimization process described above for a model vector w and training data matrix X defined by a host computer (not shown) operatively coupled to system 40. The training data set X (as well as computed values of other variables in the optimization process) may be stored locally in on-board memory of core unit 41, or may be stored in memory of the host computer and supplied to system 40 as required. The particular set of derivative modules $\nabla f_p$, $\nabla^2 f_p$, $g_q'$ and $g_q''$ for a given training operation are defined in response to a selective input from the host computer provided on control input 43 to core unit 41. Hence, system 40 can train an arbitrary number of machine learning models using derivative computations performed by any set of modules selected from derivative modules 42. System 40 thus provides a single hardware design with different computational units supporting the different derivative functions for different optimization objectives built in. Crucially, however, the vast majority of the computational hardware is shared in common for all objectives. This provides an eminently practical and highly area-efficient hardware implementation.

Figure 5:
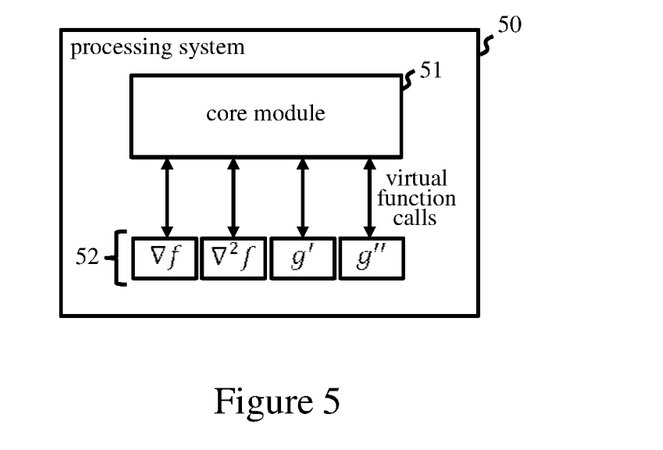
FIGS. 5 and 6 are schematic representations of software-based implementations of processing systems embodying the invention.

FIG. 5 indicates architecture of a software-based implementation of a model-training system. In this embodiment, a processing system 50 includes a core program module 51 and derivative program modules 52. The core module 51 provides a general computational kernel for configuring one or more processors (not shown explicitly) of processing system 50 to perform the generic optimization process described above for a model vector w and training data matrix X stored in system memory. Derivative modules 52 include at least a set of modules labeled $\nabla f$, $\nabla^2 f$, g' and g", where modules $\nabla f$ and $\nabla^2 f$ effect computation of first and second derivatives of a selected function $f$ for current training operation and modules g' and g" effect computation of first and second derivatives of a selected function g for the training operation. The set of modules $\nabla f$, $\nabla^2 f$, g' and g" for the current training operation are defined in system 50 via a selective input to the system. For example, the required modules may be selected by a system host, e.g. in response to input of a user or higher-level system controller, from a plurality of program modules provided for different functions $f$ and g in the system. Alternatively, for example, the modules required for a selected training operation may be provided as the selective input to the system. In this embodiment, the derivative modules are provided as static functions which are accessed by core module 51 via virtual function calls. In operation of system 50, the specific implementations for the derivatives of the selected functions $f$ and g are thus injected via virtual function calls at runtime.

Processing system 50 may be implemented by one or more (general- or special-purpose) computers which may comprise one or more CPUs, GPUs, FPGA's or other similar processing apparatus. The computational functionality is conveniently executed by a multi-core CPU and/or GPU. The inner SCD loop of core module 51 can be parallelized by performing multiple coordinate updates in parallel on a multi-core CPU or a massively-parallel GPU of system 50. In particular, the inner loop can be parallelized across multiple threads on a CPU or across multiple thread blocks on a GPU. An additional level of parallelism can be achieved in a GPU of system 50 by parallelizing the inner summations required for computation of the update value δ. The computational core has the same functional form for any selected derivative modules. This offers a very efficient software-based implementation with minimal lines of code, providing highly efficient use of processing resources in an inherently compute-intensive task.

Figure 6:
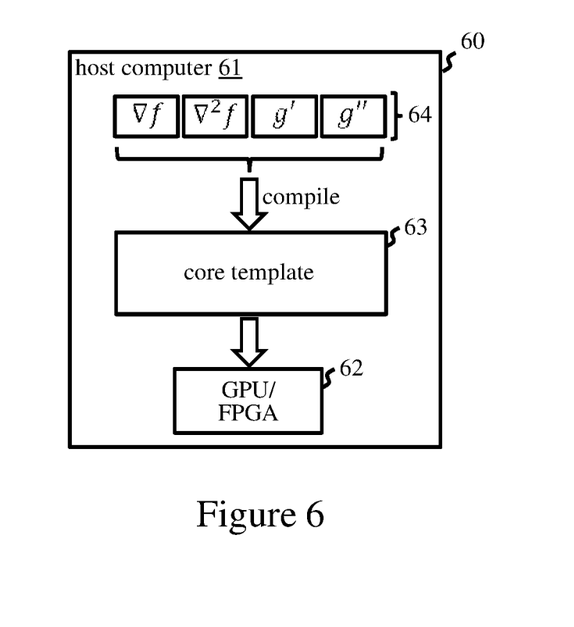

FIG. 6 indicates architecture of another software-based implementation of the system. The processing system 60 comprises a host computer 61 which is operatively connected to a GPU or FPGA indicated generally at 62. Host computer 61 includes a core program module 63 for effecting the generic optimization process, and a set of derivative program modules 64 which are defined for a current training operation. In this embodiment, the core module 63 comprises a templated software kernel, such as a templated CUDA (Computer Unified Device Architecture) or OpenCL (Open Computing Language) kernel function. The derivative modules 64 for the selected functions $f$ and g are expressed as static functions which are injected into core template 63 by host computer 61 at compile time. Host 61 thus dynamically generates an application-specific kernel using the derivative modules 64 defined for the current training operation. These derivative modules are defined via a selective input to the system as before, e.g. in response to user input indicating the functional form of $f$ and g. In particular, the selective input may specify the particular functions $f$ and g selected for the current training operation. Derivative modules for these functions may be compiled on-the-fly by host computer 61 at runtime and injected into core template 63. The resulting application-specific kernel is then sent to GPU/FPGA 62 for processing. The training data X for the training operation may be sent by host 61 for storage in local memory of GPU/FPGA 62, or may be stored in host memory and supplied to GPU/FPGA 62 as required. System 60 can thus generate an arbitrary number of different compiler-optimized kernels to be processed by GPU/FPGA 62 by injecting different derivative modules for the functional forms of derivatives of different functions $f$ and g at compile time.

Methods are provided in embodiments for implementing training of a machine learning model in a processing system, together with systems for performing such methods, where the training requires or includes optimization of an objective function $f(Xw) + \Sigma_{j=1}^{m} g(w_j)$ of a length-m model vector w and an n-by-m matrix X of training data where $f$ and g are convex functions and $f$ is smooth. Such a method includes providing a core module for effecting a generic optimization process in the processing system, and in response to a selective input, defining a set of derivative modules, for effecting computation of first and second derivatives of selected functions $f$ and g in the processing system, to be used with the core module in the training operation. The method further comprises performing, in the processing system, the generic optimization process effected by the core module using derivative computations effected by the derivative modules. The generic optimization process effected by the core module comprises an outer iterative loop which computes, for a dual vector v=Xw, a transformed vector y comprising a function of vectors of first and second derivatives of $f(v)$, performs a plurality of iterations of an inner loop of stochastic coordinate descent to update the model vector w and transformed vector y by respective update amounts dependent on first and second derivatives of $f(v)$ and $g(w_j)$, and updates the dual vector v in dependence on the updated transformed vector y.

In general, in software-based implementations of processing systems embodying the invention, program modules comprise computer system-executable instructions for execution by a computing apparatus of the system. Generally, program modules may include routines, programs, objects, components, logic, data structures, and so on that perform particular tasks or implement particular abstract data types. The computing apparatus may be practiced in distributed cloud computing environments where tasks are performed by remote processing devices that are linked through a communications network. In a distributed cloud computing environment, data and program modules may be located in both local and remote computer system storage media including memory storage devices.

Figure 7:
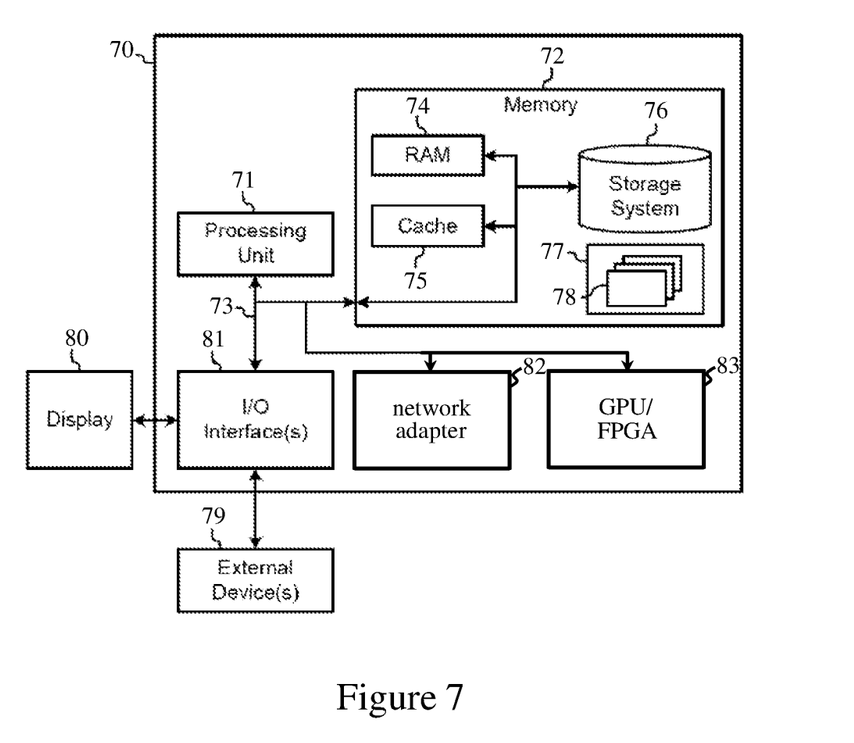
FIG. 7 is a generalized schematic of a processing system for implementing the embodiments of FIGS. 5 and 6.

The block diagram of FIG. 7 shows an exemplary computing apparatus for implementing a processing system embodying the invention. The apparatus is shown here in the form of a general-purpose computing device 70. The components of computer 70 may include processing apparatus such as one or more processors represented by processing unit 71, a system memory 72, and a bus 73 that couples various system components including system memory 72 to processing unit 71.

Bus 73 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 70 typically includes a variety of computer readable media. Such media may be any available media that is accessible by computer 70 including volatile and non-volatile media, and removable and non-removable media. For example, system memory 72 can include computer readable media in the form of volatile memory, such as random access memory (RAM) 74 and/or cache memory 75. Computer 70 may further include other removable/non-removable, volatile/non-volatile computer system storage media. By way of example only, storage system 76 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 73 by one or more data media interfaces.

Memory 72 may include at least one program product having one or more program modules that are configured to carry out functions of embodiments of the invention. By way of example, program/utility 77, having a set (at least one) of program modules 78, may be stored in memory 72, as well as an operating system, one or more application programs, other program modules, and program data. Each of the operating system, one or more application programs, other program modules, and program data, or some combination thereof, may include an implementation of a networking environment. Program modules 78 generally carry out the functions and/or methodologies of embodiments of the invention as described herein.

Computer 70 may also communicate with: one or more external devices 79 such as a keyboard, a pointing device, a display 80, etc.; one or more devices that enable a user to interact with computer 70; and/or any devices (e.g., network card, modem, etc.) that enable computer 70 to communicate with one or more other computing devices. Such communication can occur via Input/Output (I/O) interfaces 81. Also, computer 70 can communicate with one or more networks such as a local area network (LAN), a general wide area network (WAN), and/or a public network (e.g., the Internet) via network adapter 82. As depicted, network adapter 82 communicates with the other components of computer 70 via bus 73. Computer 70 may also communicate with additional processing apparatus 83, such as a GPU or FPGA, for implementing embodiments of the invention. In general, such additional processing apparatus 83 may be internal or external to computer 70. It should be understood that although not shown, other hardware and/or software components could be used in conjunction with computer 70. Examples include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for implementing training of a machine learning model in a processing system, said training requiring optimization of an objective function $f(Xw)+\Sigma_{j=1}^{m}g(w_j)$ of a length-m model vector w and an n-by-m matrix X of training data where $f$ and g are convex functions and $f$ is smooth, the method comprising:

providing a core module for effecting a generic optimization process in the processing system;

in response to a selective input, defining a set of derivative modules, for effecting computation of first and second derivatives of selected functions $f$ and g in the processing system, to be used with the core module in said training; and in the processing system, performing said generic optimization process effected by the core module using derivative computations effected by said derivative modules;

wherein said generic optimization process comprises an outer iterative loop which computes, for a dual vector v=Xw, a transformed vector y comprising a function of vectors of first and second derivatives of $f(v)$, performs a plurality of iterations of an inner loop of stochastic coordinate descent to update the model vector w and transformed vector y by respective update amounts dependent on first and second derivatives of $f(v)$ and $g(w_j)$, and updates the dual vector v in dependence on the updated transformed vector y, wherein the core module provides a generic computational core which can be used to train a number of machine learning models.

2. A method as claimed in claim 1 including:

providing a plurality of derivative modules for effecting computation of first and second derivatives of different functions $f$ and different functions g in the processing system; and defining said set of derivative modules for said selected functions by selecting those derivative modules from said plurality of derivative modules in response to said selective input.

3. A method as claimed in claim 1 wherein said outer iterative loop computes the transformed vector y by:

computing a vector c comprising the gradient vector of $f(v)$;

computing a vector d comprising the diagonal of the Hessian matrix of $f(v)$; and computing the transformed vector y as an element-wise ratio of vectors c and d.

4. A method as claimed in claim 3 wherein said outer iterative loop updates the dual vector v by an update amount dependent on difference between the updated transformed vector y at the end of said iterations of the inner loop and the transformed vector y at the start of said iterations of the inner loop.

5. A method as claimed in claim 4 wherein each iteration of said inner loop:
randomly selects a coordinate j;
computes an update value $$\delta = -\frac{\sum_{i=1}^{n} d_i y_i X_{i,j} + g'(w_j)}{\sigma_f \sum_{i=1}^{n} d_i X_{i,j}^2 + \sigma_g g''(w_j)},$$

where $\sigma_f$ and $\sigma_g$ are approximation constants;
updates $w_j$ to $w_j+\delta$; and
updates the transformed vector y to $y+\sigma_f \delta x_j$, where $x_j$ is the $j^{th}$ column of said matrix X.

6. A method as claimed in claim 5 wherein said outer iterative loop updates elements $v_i$ of the dual vector v to $$v_i + \frac{y_i - c_i/d_i}{\sigma_f}.$$

7. A computer program product for training a machine learning model in a processing system, said training requiring optimization of an objective function $f(Xw)+\Sigma_{j=1}^{m}g(w_j)$ of a length-m model vector w and an n-by-m matrix X of training data where $f$ and $g$ are convex functions and $f$ is smooth, said computer program product comprising a non-transitory computer readable storage medium having program instructions, executable by the processing system, embodied therein, the program instructions comprising:
a core module for causing the processing system to perform a generic optimization process; and
further program instructions for causing the processing system to define, in response to a selective input, a set of derivative modules for effecting computation of first and second derivatives of selected functions $f$ and $g$ to be used with the core module in said training, and to perform said generic optimization process using derivative computations effected by said derivative modules;
wherein said generic optimization process comprises an outer iterative loop which computes, for a dual vector v=Xw, a transformed vector y comprising a function of vectors of first and second derivatives of $f(v)$, performs a plurality of iterations of an inner loop of stochastic coordinate descent to update the model vector w and transformed vector y by respective update amounts dependent on first and second derivatives of $f(v)$ and $g(w_j)$, and updates the dual vector v in dependence on the updated transformed vector y,
wherein the core module provides a generic computational core which can be used to train a number of machine learning models.

8. A computer program product as claimed in claim 7 wherein:
said program instructions include a plurality of derivative modules for effecting computation of first and second derivatives of different functions $f$ and different functions $g$ in the processing system; and
said further program instructions cause the processing system to define said set of derivative modules for said selected functions by selecting those derivative modules from said plurality of derivative modules in response to said selective input.

9. A computer program product as claimed in claim 7 wherein said further program instructions cause the processing system to generate said set of derivative modules in response to a selective input indicating said selected functions $f$ and $g$.

10. A computer program product as claimed in claim 7 wherein said outer iterative loop computes the transformed vector y by:
computing a vector c comprising the gradient vector of $f(v)$;
computing a vector d comprising the diagonal of the Hessian matrix of $f(v)$; and
computing the transformed vector y as an element-wise ratio of vectors c and d.

11. A computer program product as claimed in claim 10 wherein said outer iterative loop updates the dual vector v by an update amount dependent on difference between the updated transformed vector y at the end of said iterations of the inner loop and the transformed vector y at the start of said iterations of the inner loop.

12. A computer program product as claimed in claim 11 wherein each iteration of said inner loop:
randomly selects a coordinate j;
computes an update value $$\delta = -\frac{\sum_{i=1}^{n} d_i y_i X_{i,j} + g'(w_j)}{\sigma_f \sum_{i=1}^{n} d_i X_{i,j}^2 + \sigma_g g''(w_j)}$$

where $\sigma_f$ and $\sigma_g$ are approximation constants;
updates $w_j$ to $w_j+\delta$; and
updates the transformed vector y to $y+\sigma_f \delta x_j$, where $x_j$ is the $j^{th}$ column of said matrix X.

13. A computer program product as claimed in claim 12 wherein said outer iterative loop updates elements $v_i$ of the dual vector v to $$v_i + \frac{y_i - c_i/d_i}{\sigma_f}.$$

14. A processing system for training a machine learning model, said training requiring optimization of an objective function $f(Xw)+\Sigma_{j=1}^{m}g(w_j)$ of a length-m model vector w and an n-by-m matrix X of training data where $f$ and $g$ are convex functions and $f$ is smooth, the system comprising:
a core module for effecting a generic optimization process; and
a set of derivative modules, defined in response to a selective input to the system, for effecting computation of first and second derivatives of selected functions $f$ and $g$ to be used with the core module in said training;
the system being operable to perform said generic optimization process effected by the core module using derivative computations effected by said derivative modules;
wherein said generic optimization process comprises an outer iterative loop which computes, for a dual vector v=Xw, a transformed vector y comprising a function of vectors of first and second derivatives of $f(v)$, performs a plurality of iterations of an inner loop of stochastic coordinate descent to update the model vector w and transformed vector y by respective update amounts dependent on first and second derivatives of $f(v)$ and $g(w_j)$, and updates the dual vector v in dependence on the updated transformed vector y, wherein the core module provides a generic computational core which can be used to train a number of machine learning models.

15. A system as claimed in claim 14 including a plurality of derivative modules for effecting computation of first and second derivatives of different functions $f$ and different functions g, the system being adapted to define said set of derivative modules for said selected functions by selecting those derivative modules from said plurality of derivative modules in response to said selective input.

16. A system as claimed in claim 15 comprising ASIC hardware implementing said core module and said derivative modules.

17. A system as claimed in claim 14 wherein said outer iterative loop computes the transformed vector y by:
- computing a vector c comprising the gradient vector of $f(v)$;
- computing a vector d comprising the diagonal of the Hessian matrix of $f(v)$; and
- computing the transformed vector y as an element-wise a ratio of vectors c and d.

18. A system as claimed in claim 17 wherein said outer iterative loop updates the dual vector v by an update amount dependent on difference between the updated transformed vector y at the end of said iterations of the inner loop and the transformed vector y at the start of said iterations of the inner loop.

19. A system as claimed in claim 18 wherein each iteration of said inner loop:
- randomly selects a coordinate j;
- computes an update value where $$\delta = \frac{\sum_{i=1}^{n} d_i y_i X_{i,j} + g'(w_j)}{\sigma_f \sum_{i=1}^{n} d_i X_{i,j}^2 + \sigma_g g''(w_j)},$$

$\sigma_f$ and $\delta_g$ are approximation constants;
- updates $w_j$ to $w_j + \delta$; and
- updates the transformed vector y to $y + \sigma_f \delta x_j$, where $x_j$ is the $j^{th}$ column of said matrix X.

20. A system as claimed in claim 19 wherein said outer iterative loop updates elements $v_i$ of the dual vector v to $$v_i + \frac{y_i - c_i/d_i}{\sigma_f}.$$

* * * * *